Patented July 11, 1944

2,353,223

UNITED STATES PATENT OFFICE 2,353,223

PURIFICATION OF STYRENE STILL BOTTOMS

Frank W. Corkery, Crafton, and Samuel G. Burroughs, Pittsburgh, Pa., assignors to Pennsylvania Industrial Chemical Corporation, Clairton, Pa., a corporation of Pennsylvania No Drawing. Application July 17, 1943, Serial No. 495,218

2 Claims. (Cl. 260—91)

This invention relates to a method of purifying "styrene still bottoms."

In accordance with known practices, styrene for polymerization into styrene resin and particularly for co-polymerization with butadiene is produced synthetically in large quantities. The method of making styrene synthetically chiefly practiced is to produce ethyl-benzene by reaction from benzol and ethylene, using a Friedel-Crafts catalyst such as anhydrous aluminum chloride. The ethyl-benzene is then dehydrogenated to vinyl-benzene (styrene) by passing the ethyl-benzene in the state of a vapor over suitable catalysts, such as metallic oxides of the nature of aluminum oxide, at elevated temperatures, such as temperatures of 650° C. to 950° C. The crude styrene so produced is then distilled in towers to recover substantially pure styrene for the manufacture of styrene resins or for co-polymerization.

As a result of this distillation there is derived a waste material known as "styrene still bottoms." The "styrene still bottoms" contain impure styrene polymers, as well as some pure styrene polymers, polymers of resin-forming unsaturates having a normal source relationship or chemical relationship to styrene, such as coumarone-indene, and the addition products of styrene with aromatic compounds such as ethyl-benzene, benzol, xylol, and the like. The "styrene still bottoms" are contaminated with substances such as sulphur, aluminum chloride complexes or addition products, and other impurities gathered from the several stages of the method by which the styrene is produced. The "styrene still bottoms" have been above described as a waste material, and prior to our invention, this material, which resembles a black, viscous oil, was disposed of by burning. Its chief contaminant is sulphur and sulphur compounds.

We have discovered that a new and useful product is obtainable by treating the "styrene still bottoms" in such manner that such preponderantly styrene product is substantially free of sulphur and other contaminates, and is of changed properties. Also, we have discovered that such product derived from "styrene still bottoms" provides a plasticizer for thermoplastic resins having in high order the above noted desired characteristics.

Taking the "styrene still bottoms" as our starting material, preferably we thin it with an inert diluent, such as petroleum naphtha, coal tar naphtha, or a mixture of those solvents. Any quantity of the diluent which reduces the viscosity of the "still bottoms" sufficiently for effective filtration will cause some precipitation of sulphur and other impurities. Maximum precipitation is obtained by utilizing a preponderantly petroleum diluent in a volume at least equal to that of the "still bottoms." In using a coal tar diluent, some proportion of the sulphur and other impurities are taken into solution in the diluent. After dilution and precipitation, the precipitated impurites are filtered out. It should be understood in this connection that we do not regard the content of coumarone, indene, benzol, and other substances related to the styrene as impurities, but consider as such only sulphur and other substances chemically unrelated to the styrene.

After filtration, we treat the filtrate for approximately complete removal of sulphur by agitating with it a water solution of an alkaline sulphide such as sodium sulphide. Treatment with an alkaline sulphide is the effective and critical factor in our method of purifying "styrene still bottoms." The precipitation and filtration above described is desirable because it gives an initial partial purification in a preliminary stage. It is, however, not essential and may be omitted if so desired.

Addition of the alkali sulphide, which typically is a 10% water solution of sodium sulphide, is continued with agitation to form sodium polysulphide until a suitable test indicates that no substantial content of free sulphur remains in the "still bottoms." The batch is then washed with water, is allowed to settle, and the treated material and water are separated as by decantation. If diluent has not already been added to the "still bottoms" in equal volume, such addition preferably is made before washing. Two or more water washes may be required substantially to complete removal of the polysulphide, which is preferentially soluble in the water. Formation of polysulphide occures slowly at normal room temperature, but takes place more rapidly at temperatures of moderate elevation, and it is therefore desirable to heat the "still bottoms" to from about 50° C. to 100° C. for the sulphide treatment.

A relatively rough test for the completeness of sulphur removal is to wash out the solution with a water solution of sodium hydroxide, and to note the color of the caustic solution. If the color of the solution is relatively deep, the sodium sulphide treatment should be repeated. A typical example of the treatment and that test is as follows:

*Example*

1000 cc. of "styrene still bottoms" from the distillation of a styrene liquid produced synthetically as above, was diluted with 130 cc. of high-flash solvent naphtha. It was heated to 70° C. and 1000 cc. of mineral spirits was slowly added. The solution was allowed to settle for about 12 hours, and was then decanted from the free sulphur and sulphur compounds which had precipitated.

The solution, purified to the extent of precipitation, was then agitated for about 8 hours with 200 cc. of a 10% solution of sodium sulphide in water. This solution was made by heating fused sodium sulphide of 60% purity with the amount of water calculated to yield a 10% solution of 100% sodium sulphide. When agitation was discontinued and stratification had taken place, the water solution of sulphides and polysulphides was drawn off.

The treated solution of "still bottoms" was tested for purification by washing it with 100 cc. of a 10% water solution of sodium hydroxide, and after stratification this wash solution was drawn off and its color was observed. If the color of the caustic solution is deeper than a straw color, we repeat the sodium sulphide treatment without further dilution of the "still bottoms."

Allowing for progressive exhaustion of the sodium sulphide solution, the reaction with sodium sulphide is a time-temperature reaction. We have found such variation in the effect of the treatment on different lots of the "styrene still bottoms" that we consider it desirable to make a test for the order of purification which has been effected after each initial sulphide treatment.

The order of purification being satisfactory, the treated solution was given two washes, each with 500 cc. of clear water, for the removal of polysulphide, and finally was washed with a 10% sodium hydroxide solution in water. The washed solution was then distilled. We have found that desirable procedure in distillation is to raise the temperature of the still to about 250° C. and to introduce live steam, with or without vacuum, to remove the light and heavy oils associated with the treated "styrene still bottoms," as well as the solvent with which it has been diluted. The residue may be run off from the still. The continuance of the distillation depends in each instance on the extent to which it is desired to remove the heavy oils, which preponderantly are composed of the styrene dimers.

A more exact test for the retention of sulphur in the solution of "styrene still bottoms," after treatment, is as follows:

One gram of the "still bottoms" solution was placed in a 125 ml. Erlenmeyer flask with 10 ml. of stannous chloride solution and 10 ml. of distilled water. The stannous chloride solution desirably was made by mixing 200 gm. of

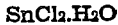

$SnCl_2.H_2O$ with 200 ml. of concentrated HCl and 50 ml. distilled water. The flask was then closed with a piece of filter paper. The filter paper was moistened with lead acetate solution, which desirably may be made from 5 gm. of lead acetate and 100 ml. of distilled water with a drop of acetic acid to clear the solution. The flask was heated gently to just below the boiling point until the filter paper was blackened. It was then replaced by a fresh similarly moistened paper, and this was repeated as long as the papers were blackened by the evolution of hydrogen sulphide. The number of papers blackened is an index of the sulphur content of the treated "still bottoms."

The residue of the distillation, which is our desired product, possesses distinguishing properties rendering it a new product derived from waste in distinction from a purified example of a useful known material. This product is composed of low polymers of styrene and low polymers of other related resin-forming unsaturates such as coumarone and indene, together with any retained addition products of those unsaturates with units of the various other chemically related substances inherent in the composition of the starting material. The product is composed preponderantly of the low polymers of styrene.

This product is obtained in a yield approximating 60% to 70% the weight of the starting material. In accordance with the order in which the heavy oil has been removed by distillation, it varies from a heavy, extremely viscous semi-solid to a soft solid also of extremely high viscosity. It is a deep brown in mass, or light yellow in a thin film, as compared with the black "styrene still bottoms," and when distilled to the condition of a semi-solid is in substantial entirety insoluble in aliphatic hydrocarbon solvents.

In its physical properties, this preponderantly styrene product resembles a gel, and in its more solid exemplifications it has a ball and ring softening point within the approximate range of 20° C. to 60° C. It possesses the property of distensibility and in lesser measure the property of recoverability, being thus somewhat elastic. The primary resemblance of the product is to an oil gel differing, however, from the oil gels by exhibiting some progressive decrease in viscosity above its softening point. It does not, however, possess the property of thermoplasticity in an order approaching that of the thermoplastic resins. The preponderantly styrene product derived from treatment of the "styrene still bottoms" does not resemble any polymeric form of styrene previously known, or any previously known blend of styrene polymers containing different numbers of monomeric units. In spite of its low softening point and its content of low polymers of unsaturates other than styrene, it is insoluble in aliphatic hydrocarbon solvents such as the petroleum distillates and greases, and in fatty acid glycerides. The product is compatible with both pure and impure styrene resins of relatively high polymeric structure, and with high polymers of coumarone-indene resins, terpene resins, petroleum resins, and with other thermoplastic resins and products of co-polymerization. Being of hydrocarbon nature, the preponderantly styrene product of our invention possesses the additional advantage that it has neither acid nor saponification values.

The remarkably high viscosity of the product gives it particular utility in plasticizing thermoplastic resins for various uses. It is thus highly desirable as an ingredient of compositions used for laminating paper and as an ingredient of molding compositions. It is an excellent saturant for automotive brake linings.

In plasticizing thermoplastic resins which lack strength, of which resins coumarone-indene resin may be taken as typical, our preponderantly styrene product functions as a strength-imparting plasticizer. In plasticizing thermoplastic resins such as thermoplastic styrene resin, which are of themselves oil-proof, it gives an oil-resistant blend in making binding media, laminating media, for use in mastic tile, or for other uses in which an oil-proof plasticized resin is advantageous.

It is possible by our purification process as above disclosed to obtain products which are substantially free of sulphur and other contaminates of the "styrene still bottoms" from which they are produced. A rough definition of the word "substantial" is to be found in the tests for the presence of sulphur given above. That is, the product is considered to be "substantially" free from sulphur if a sodium hydroxide wash as above described is colored no deeper than a straw color, or if it blackens no more than 10 papers in accordance with the more exact test also given.

We claim as our invention:

1. The herein described method of purifying "styrene still bottoms" resulting from the distillation of styrene synthetically produced by dehydrogenation of ethyl-benzene, by bringing the said "still bottoms" into reactive contact with an alkali sulphide to convert its initial content of sulphur and sulphur compounds into polysulphides and separating the said polysulphides from the purified "still bottoms" by water washing.

2. The herein described method of obtaining semi-solid and solid purified products from "styrene still bottoms" resulting from the distillation of styrene synthetically produced by dehydrogenation of ethyl-benzene, by bringing the said "still bottoms" into reactive contact with an alkali sulphide to convert its initial content of sulphur and sulphur compounds into polysulphides, separating the said polysulphides from the purified "still bottoms" by water washing, and recovering a styrene product in semi-solid to solid state from the said purified "styrene still bottoms."

FRANK W. CORKERY.
SAMUEL G. BURROUGHS.